United States Patent Office 3,488,297
Patented Jan. 6, 1970

3,488,297
PROCESS FOR THE PREPARATION OF INTERNALLY PLASTICIZED EPOXIDE RESINS
Zissis Aggias, Hilden, Rhineland, Germany, assignor to Henkel & Cie, GmbH, Holthausen, Germany, a corporation of Germany
No Drawing. Filed Nov. 16, 1967, Ser. No. 683,457
Claims priority, application Germany, Nov. 30, 1966, H 61,146
Int. Cl. C08g 30/16, 22/06
U.S. Cl. 260—2                                    10 Claims

ABSTRACT OF THE DISCLOSURE

This invention relates to a process for the preparation of an internally plasticized hardened epoxide resin having increased flexibility without a substantial effect on its thermal properties which comprises the steps of reacting a mixture consisting essentially of (1) from about 90% to 55% by weight of said mixture of a crystalline triglycidal isocyanurate having an epoxide oxygen content of at least 14% and (2) from about 10% to 45% by weight of said mixture of long-chain organic compounds having at least two terminal isocyanate groups per molecule and free of other reactive groups, said long-chain organic compounds having a molecular weight between about 800 and 3,000, with an organic aromatic amine epoxide hardener under epoxide resin hardening conditions, and recovering said internally plasticized hardened epoxide resin.

CLAIM FOR PRIORITY

Under the provisions of 35 U.S.C. 119, the right of priority is hereby claimed, based on the corresponding German Patent Application H 61,146, filed Nov. 30, 1966.

THE PRIOR ART

Hardened synthetic resins, based on organic compounds containing more than one epoxide group in the molecule, frequently exhibit a very high resistance to deformation by heat. To a particular degree, this characteristic is present in hardened reaction products from crystalline triglycidal isocyanurate and usual epoxide resin hardening agents. On the other hand, the mechanical properties of such hardened epoxide resins, manifest their impact strength and flexural strength, are often not of maximum degree. The tendency to develop cracks with temperature changes renders such resins useless for various purposes. For example, if metal armatures with grooves and ridges are placed in a casting mixture of crystalline triglycidal isocyanurate and a dicarboxylic acid anhydride, especially with temperature changes, more or less large cracks will develop. The mechanical, in particular the flexible properties of such epoxide resins can be improved by an addition to the hardenable mixture of plasticizers. For this purpose, "external plasticizers" have been considered, however, these entail certain disadvantages. More favorable results can be obtained with "internal plasticizers." However, it has been ascertained, that with an addition of a small quantity of internal plasticizers, a relatively significant decrease in the resistance to deformation by heat occurs in the hardened resin, which result is in an unfavorable relation to the obtained improvement of the mechanical characteristics. In other words, only an insignificant improvement of the flexible properties of the hardened resin is obtained with a considerable loss in the thermal properties.

OBJECTS OF THE INVENTION

An object of the invention is to avoid these shortcomings of the known plasticizing processes and to establish a method which will effect a good flexibilization of the hardened epoxide resins with relatively slight loss to the thermal properties.

A further object of the invention is to develop a process for the preparation of an internally plasticized hardened epoxide resin having increased flexibility without a substantial effect on its thermal properties which comprises the steps of reacting a mixture consisting essentially of (1) from about 90% to 55% by weight of said mixture of a crystalline triglycidal isocyanurate having an epoxide oxygen content of at least 14% and (2) from about 10% to 45% by weight of said mixture of long-chain organic compounds having at least two terminal isocyanate groups per molecule and free of other reactive groups, said long-chain organic compounds having a molecular weight between about 800 and 3,000, with an organic aromatic amine epoxide hardener under epoxide resin hardening conditions, and recovering said internally plasticized hardened epoxide resin.

Another object of the invention is the production of an internally plasticized hardened epoxide resin based on crystalline triglycidal isocyanurate having an epoxide oxygen content of at least 14% produced by the above process and having both increased flexibility and good thermal properties.

A yet further object of the invention is the development of a process for the preparation of an internally plasticized hardened epoxide resin adhesive bond having a marked thermal shear strength which comprises melting a mixture consisting essentially of (1) from about 90% to 55% by weight of said mixture of crystalline triglycidal isocyanurate having an epoxide oxygen content of at least 14% and (2) from about 10% to about 45% by weight of said mixture of long-chain organic compounds having at least two terminal isocyanate groups per molecule, and free of other reactive groups, said long-chain organic compounds having a molecular weight between about 800 and 3,000 with 4,4'-diamino-3,3'-dichlorodiphenylmethone, mixing said melt with finely distributed fillers, applying said melt mixture between surfaces to be bonded and curing said melt mixture under epoxide resin hardening conditions.

These and other objects of the invention will become more apparent as the description thereof proceeds.

It has now been discovered that these objects can be achieved in the hardening of hardenable epoxide resins in that crystalline triglycidyl isocyanurate having an epoxide oxygen content of at least 14% is reacted with long-chain organic compounds having at least two terminal free isocyanate groups in the molecule with a molecular weight of between 800 and 3,000, preferably between 1,000 and 2,000, and with aromatic amine epoxide resin hardeners.

As one of the starting substances for the process of the invention, crystalline triglycidyl isocyanurate is used, prepared in the usual manner, having an epoxide oxygen content of at least 14%. In general, technical mixtures of the high- and low-melting forms of the crystalline triglycidyl isocyanurate are employed. Crystalline triglycidyl isocyanurates having the above characteristics are described in U.S. Patent No. 3,337,509, dated Aug. 22, 1967.

The long-chain organic compounds having at least two terminal isocyanate groups per molecule and free of other reactive groups are, for example, linear polyethers and/or linear polyesters with terminal isocyanate groups, which have a molecular weight of 800 to 2,800. Such isocyanates are known and can be obtained, for example, by reacting polyethers containing terminal free hydroxyl groups, with poly-valent, preferably di-valent organic isocyanates. Suitable as polyethers having terminal free hydroxyl groups are, for example, poly(oxyalkylene)glycols, such as poly(oxyethylene)glycol, poly(oxypropylene)glycol or poly(oxybutylene)glycol and the like. Instead of or in addition to the polyethers having terminal free hydroxyl groups, polyesters prepared in the usual manner from organic dicarboxylic acids and an excess of dihydric alcohols by esterification, can be used as compounds containing terminal free hydroxyl groups. Suitable polyesters can be composed, for example, of organic dicarboxylic acids, such as alkanedioic acids, for example, adipic acid, succinic acid, sebacic acid; phenyldicarboxylic acids, for example, phthalic acid, terephthalic acid; cycloalkyl carboxylic acids, for example, hexahydroterephthalic acid; alkenedioic acids, for example, maleic acid, fumaric acid; esterified with alkanediols, such as ethyleneglycol, propyleneglycol and heptanediol, and glycols, such as diethyleneglycol or thiodiglycol. Furthermore, polyesters based on lactones such as caprolactone are suitable. Lastly, long-chain polyhydric alcohols can be used, with good results, as compounds containing terminal free hydroxyl groups, for example, dimerized fatty alcohols.

The reaction of these compounds having free terminal hydroxyl groups to give long-chain organic compounds having at least two free isocyanate groups is conducted in the well known manner, with low-molecular-weight poly-valent isocyanates, preferably diisocyanates, such as toluylene diisocyanate, diphenylmethane, diisocyanate, dianisdine diisocyanate, napthallinone-1,5-diisocyanate, hexametylene diisocyanate, dodecane diisocyanate, dicyclohexylmethane-1,4-diisocyanate and others. The long-chain organic compounds having terminal isocyanate groups which are prepared as described above are known as so-called prepolymers for the production of polyurethane synthetics.

The indicated compounds containing free isocyanate groups are utilized advantageously at an amount of from 10% to 45% by weight, preferably from 20% to 35% by weight, based on the overall weight of the mixture of crystalline triglycidyl isocyanurate and the compounds having free isocyanate groups.

For the process of the invention the usual, well-known organic aromatic amine epoxide hardeners can be utilized, for example, the isomeric toluidines, β-naphthylamine, the isomeric phenylenediamines, benzidine, chloroaniline, dichloroaniline, chlorinated benzidine, 4,4'-diaminodiphenylmethane, 4,4' - diamino-3,3'-dimethoxydiphenylmethane, 4,4'-diamino-3,3'-di-chlorodiphenylmethane, 4,4'-diamino-3,5, 5,5'-tetrabromodiphenylmethane, 4,4' - diamino-diphenyloxide, diaminodiphenylsulfide, diaminodiphenylsulfone, N-(hydroxypropyl)-m-phenylenediamine. Preferred are those amines which contain two primary amine groups.

The amount of the aromatic amine epoxide hardeners to be used should be such that 0.4 to 1.2, preferably 0.6 to 1.0 reactive amine hydrogens are allotted to each epoxide group, and that 0.2 to 1.2, preferably 0.4 to 1.0 reactive amine hydrogens are allotted to each isocyanate group.

Especially favorable results are obtained when 4,4'-diamino-3,3'-dichlorodiphenylmethane is used as the aromatic amine epoxide hardener, combined with a reaction product from poly(oxybutylene)glycol and a diisocyanate at the ratio previously indicated.

To effect the process of the invention advantageously, the crystalline triglycidyl isocyanurate and the long-chain organic compounds having free isocyanate groups are melted together, and directly thereafter the aromatic amine epoxide hardeners are introduced into the melt. Another possibility to effect the process consists in that the three reactants are first admixed with one another and then melted. Liquid mixtures are thus obtained which, after prompt cooling, can be, if so desired, stored even at room temperature in liquid form for a centain length of time without causing gelatinization. These liquid prereaction products can be used advantageously, for example, as adhesive bonds. As they are soluble, easily and with a high concentration, in organic solvents, such as acetone, butyl acetate, methylene chloride and the like, they can be employed, for example, for the impregnation of fibrous materials, such as mineral fiber fabrics, paper and others, or they can be utilized as coating agents, in particular for metals. If so desired, the impregnation can be effected without an addition of solvents at slightly elevated temperatures. By selecting proper reaction components, these melt liquid mixtures are capable of solidifying even at room temperature, and they can be utilized in solid form, after having been pulverized, as fluidified bed sinter powder.

The actual reaction or hardening of the reaction components into hardened internally plasticized epoxide resins is effected at elevated temperatures ranging between 100 C. and 200° C., preferably between 120° C. and 180° C., lasting about from 1 to 20 hours, preferably from 2 to 8 hours. After this length of time, in most cases the formation of the hardened epoxide resin has been completed. However, it can be of advantage, additionally to temper the molded bodies for a certain period of time at higher temperatures, for example, at 150° C. to 210° C.

In well known manner, dyes or fillers may be added to the mixtures of the invention, such as, for example, metal powders, quartz powder, glass powder, glass fibers, mica, aluminum oxide, titanium oxide, zirconium oxide, ground dolomite or barium sulfate.

The plastic resins, obtained according to the process of the invention, can be employed advantageously as cast resins. It is also possible to cast them around, for example, complicated armatures without causing any development of cracks on the edges or grooves during the hardening process. The electrical properties of the hardened epoxide resins obtained according to the invention evidence no decline in comparison with the excellent values which are obtained with molded bodies hardened with organic polycarboxylic acid anhydrides, based on crystalline triglycidyl isocyanurate. Compared with these, the epoxide resins of the invention show a superior impact strength as well as flexural strength.

Moreover, the epoxide resins, prepared according to the process of the invention, can be utilized as adhesive bonds, as putty and as coating materials. In the case where adhesive bonds have been prepared from the mixtures of the invention, the addition of finely distributed fillers has proved as particularly advantageous. For this purpose, for example, ground dolomite with a grain size of below 50μ can be used. Such adhesive bonds exhibit, in particular when 4,4'-diamino - 3,3' - dichlorodiphenylmethane is used as polyadduct former, a marked thermal shear strength. The adhesive bonds obtained according to the process of the invention are suitable to join rigid surfaces, such as glass, porcelain, ceramics and especially metals, such as, for example, steel, copper, brass, aluminum, chromium, nickel, titanium and the like.

The following specific embodiments are illustrative of the practice of the invention. They are not, however, to be deemed limitative in any manner.

In the following examples Martens temperature, impact strength, deflection, flexure strength and surface leakage of current have been measured according to DIN 53,458, DIN 53,452, DIN 53,453 and DIN 53,480, respectively.

Example 1

Mixtures were prepared from crystalline triglycidyl isocyanurate (mixture of the high and low melting form; epoxide oxygen content=15.5%) and 4,4'-diamino-3,3'-dichlorodiphenylmethane as hardeners. These mixtures were melted together with various amounts of a diisocyanate, which had been prepared by reacting a poly(oxybutylene)glycol-1,4(molecular weight; 1000) with an excess of toluylene diisocyanate and which had a free isocyanate content of 6.0%. After the components had been thoroughly admixed, molded bodies measuring 10 x 15 x 120 mm. were cast at a temperature of 110° C. Then these molded bodies were hardened, first at 110° C. for 5 hours, then at 150° C. for 16 hours.

Table I presents the results of tests of the molded bodies obtained by this process. In the first three columns the amount of the triglycidyl isocyanurate, of the hardener and of the diisocyanate is indicated. The following columns show the Martens temperature, impact strength, deflection and flexural strength. The surface leakage of current amounted in each case to KA 3 c.

TABLE III

| | Shear Strength in kg./mm.² at— | |
|---|---|---|
| | 20° C. | 200° C. |
| Diisocyanate: | | |
| A | 2.12 | 1.7 |
| B | 1.9 | 1.8 |
| C | 1.6 | 1.7 |
| D | 1.9 | 1.7 |
| E | 1.8 | 1.4 |

A=Reaction product of poly(oxybutylene)glycol-1,4 (molecular weight=1,000) with an excess of toluylene diisocyanate, having a content of 6.3% of free isocyanate groups.
B=Reaction product of poly(oxypropylene)glycol (molecular weight=1,000) with the addition product of 3 mols of toluylene diisocyanate of 1 mol of trimethylolpropane, having a free isocyanate content of 3%.
C=Reaction product from a dimerized fatty alcohol (average number of 36 carbon atoms) with an excess of toluylene diisocyanate, having a free isocyanate content of 9.7%.
D=Reaction product of poly(oxypropylene)glycol (molecular weight=1,000) with an excess of toluylene diisocyanate, having a free isocyanate content of 7%.
E=Reaction of poly(oxybutylene) glycol-1,4 with an excess of diphenylmethane diisocyanate, having a free isocyanate content of 3.5%.

TABLE I

| TGI, gm. | Hardener, gm. | Diisocyanate, gm. | Martens Temp., °C. | Impact Strength, kg. cm./cm.² | Deflection, mm. | Flexural Strength, kg./cm.² |
|---|---|---|---|---|---|---|
| 100 | 60 | 0 | 180 | 15 | 5 | 1,340 |
| 90 | 56 | 10 | 178 | 19.2 | 6.5 | 1,440 |
| 80 | 60 | 20 | 180 | 24.3 | 6 | 1,160 |
| 80 | 57.5 | 20 | 177 | 24 | 9 | 1,540 |
| 80 | 52 | 20 | 179.5 | 23.2 | 8 | 1,440 |
| 70 | 52 | 30 | 166 | 40 | 11.4 | 1,490 |
| 60 | 42.5 | 40 | 104 | 26 | 9 | 1,120 |

Example 2

Mixtures were prepared from crystalline triglycidyl isocyanurate (mixture of high and low melting form: epoxide oxygen content=15.4%) and 4,4'-diamino-3,3'-dichlorodiphenylmethane as the aromatic amine epoxide resin hardener, as well as the diisocyanate used in Example 1. Degreased aluminum sheets, measuring 2 x 20 x 100 mm. were bonded together with a 2 cm.² overlap with these mixtures and hardened over a period of 16 hours at a temperature of 150° C.

In Table II the first three columns indicate the amounts of the triglycidyl isocyanurate, of the hardener and of the diisocyanate. The following columns indicate the shear strength in kg./mm.², measured at temperatures of 20° and 200° C.

TABLE II

| TGI, gm. | Hardener, gm. | Diisocyanate, gm. | Shear Strength in k./mm.² at— | |
|---|---|---|---|---|
| | | | 20° C. | 200° C. |
| 90 | 65 | 10 | 1.45 | 1.6 |
| 80 | 60 | 20 | 1.8 | 1.65 |
| 70 | 54 | 30 | 2 | 1.6 |
| 60 | 49 | 40 | 2.2 | 1.3 |

Example 3

Mixtures were prepared each from 80 gm. of crystalline triglycidyl isocyanurate (technical mixture of the high and low melting form; epoxide oxygen content =15.4%), 70 gm. of 4,4'-diamino-3,3'-dichlorodiphenylmethane, 85 gm of ground dolomite (grain size: ∼20μ) and 20 gm. of a diisocyanate, which will be described in the following. The mixtures were melted and applied onto degreased aluminum sheets measuring 2 x 2 x 100 mm., which were then joined together with a 2 cm.² overlap. The adhesive bond was hardened for 16 hours at a temperature of 150° C.

In the Table III, the first column indicates the diisocyanate type employed, and in the following columns the shear strength measured at temperatures of 20° and 200° C. is given.

Example 4

A mixture was prepared from 70 gm. of crystalline triglycidyl isocyanurate (technical mixture of the high and low melting form; epoxide oxygen content=15.4%), 40 gm. of diaminodiphenylsulfone and 30 gm. of the diisocyanate used according to Example 1. Degreased aluminum sheets were bonded together with this mixture in the usual manner, and the sheets were cured over a period of 16 hours at a temperature of 150° C.

The following shear strengths were measured:

(a) at 20° C.=1.7 kg./mm.²
(b) at 200° C.=1.3 kg./mm.²

The preceding specific embodiments are illustrative of the practice of the invention. It is to be understood, however, that other expedients known to those skilled in the art can be employed without departing from the spirit of the invention and the scope of the appended claims.

I claim:

1. A process for the preparation of an internally plasticized hardened epoxide resin having increased flexibility without a substantial effect on its thermal properties which comprises the steps of reacting at a temperature of 100–200° C. a mixture consisting essentially of (1) from about 90% to 55% by weight of said mixture of a crystalline triglycidyl isocyanurate having an epoxide oxygen content of at least 14% and (2) from about 10% to 45% by weight of said mixture of long-chain organic compounds having at least two terminal isocyanate groups per molecule and free of other reactive groups, said long-chain organic compounds having a molecular weight between about 800 to 3000, with an organic aromatic amine epoxide hardener, and recovering said internally plasticized hardened epoxide resin.

2. The process of claim 1 wherein the amount of said organic aromatic amine epoxide hardener is chosen so that from 0.4 to 1.2 reactive amine hydrogens are present for each epoxide group and 0.2 to 1.2 reactive amine hydrogens are present for each isocyanate group.

3. The process of claim 2 wherein 0.6 to 1.0 reactive amine hydrogens are present for each epoxide group are present for each epoxide group and 0.4 to 1.0 reactive amine hydrogens are present for each isocyanate group.

4. The process of claim 1 wherein the molecular weight of said long-chain organic compounds having at least two terminal isocyanate groups per molecule is between about 1000 and 2000.

5. The process of claim 1 wherein said organic aromatic amine epoxide hardener has two primary amine groups in the molecule.

6. The process of claim 5 wherein said organic aromatic diamine is 4,4'-diamino-3,3'-dichlorodiphenyl-methane.

7. The process of claim 1 wherein said mixture consists of from 80% to 65% by weight of said crystalline triglycidyl isocyanurate and from 20% to 35% by weight of said long-chain organic compounds having at least two terminal isocyanate groups per molecule.

8. The process of claim 1 wherein said long-chain organic compounds having at least two terminal isocyanate groups per molecule is selected from the group consisting of linear poly(oxyalkylene)-glycols reacted with an excess of a low molecular weight organic polyisocyanate and linear polyesters having at least two terminal hydroxyl groups reacted with an excess of a low molecular weight organic polyisocyanate.

9. The process of claim 1 wherein said long-chain organic compound having at least two terminal isocyanate groups per molecule is the reaction product of a dimerized higher fatty alcohol with a low molecular weight organic polyisocyanate.

10. The hardened, internally plasticized epoxide resin having increased flexibility without a substantial effect on its thermal properties produced by the process of claim 1.

References Cited

UNITED STATES PATENTS

| | | |
|---|---|---|
| 3,158,586 | 11/1964 | Krause. |
| 3,337,509 | 8/1967 | Budnowski. |
| 3,372,083 | 3/1968 | Evans. |

WILLIAM H. SHORT, Primary Examiner

T. PERTILLA, Assistant Examiner

U.S. Cl. X.R.

117—127, 155, 161; 161—186; 260—37, 77.5, 830